UNITED STATES PATENT OFFICE.

JONAS W. AYLSWORTH, OF EAST ORANGE, NEW JERSEY.

PLASTIC PHENOLIC CONDENSATION PRODUCT.

13,531. Specification of Reissued Letters Patent. Reissued Feb. 11, 1913.

No Drawing. Original No. 1,046,137, dated December 3, 1912, Serial No. 604,982. Application for reissue filed January 3, 1913. Serial No. 740,268.

*To all whom it may concern:*

Be it known that I, JONAS W. AYLSWORTH, a citizen of the United States, and a resident of East Orange, Essex county, New Jersey, have invented a certain new and useful Plastic Phenolic Condensation Product, of which the following is a description.

The present invention relates to the class of bodies which are formed by reaction between phenols or their homologues or derivatives and formaldehyde or its polymers, or other methylene containing substances, which bodies are characterized by being infusible, refractory, and chemically inert.

The invention has for its object the production of a substance which has properties differing materially from those previously described in this art, among which may be named its capability of being shaped or worked when heated to plasticity in a similar manner to celluloid.

The improved product is particularly adapted to the manufacture of sound records, embossed articles, printing and engraving plates, electrical insulators, novelties, buttons, roofing, furniture, book covers, toys, etc.

In my previous applications now pending, particularly application Serial No. 496,060, filed May 14, 1909, plastic composition and process of manufacturing the same, and application Serial No. 543,238, filed February 11, 1910, phenolic condensation product and method of preparing the same, I have described phenolic condensation products containing a substance which performs the function of a final product solvent or plasticity agent in the ultimate infusible mass. Such substances, of which in my previous applications I have named a number, such as naphthalene and certain of its derivatives, remain in the product in solidified solution or emulsion.

The present invention relates particularly to compositions of the class described containing one or another of a specific class of substances for fulfilling the same purpose as the plasticity agents referred to, which substances I find to be more effective than those previously described. The greater efficiency of the substances referred to is evidenced chiefly by the fact that by their use harder compositions than those previously known may be obtained, and which compositions may be shaped or impressed or embossed in their ultimate hardened state by the application of heat and pressure with greater facility than in the case of previous products. Briefly, the substances which I find to give the improved properties are the higher halogen substitution derivatives of phenols and their homologues and derivatives, together with certain compounds of the same, all of which derivatives and compounds I will designate generically as halogenated phenolic substances.

I have observed that when comparatively large proportions of the plasticity agents referred to by me in my previous applications, such, for example, as mono-nitro-naphthalene, are incorporated with the reacting substances at some stage previous to the change therein to an infusible ultimate product, there results during such reaction a greater condensation than can otherwise take place. This is evidenced by the unexpected fact that a phenol formaldehyde condensation product containing, for example, 30% of mono-nitro-naphthalene, is as hard or harder than the pure condensation product having no mono-nitro-naphthalene contained therein. Solid mono-nitro-naphthalene is not a hard substance itself, and when mixed with other hard non-reacting substances, has the property of softening them to an extent proportionate to its percentage in the mixture. Since, therefore, when it is an element in compositions of the character described, a product is formed which is fully as hard as if it were not present, it would appear that its action must have been to induce or render possible a more advanced reaction between the reacting substances than would otherwise be possible, resulting in the formation of a very much harder condensation product. I attribute this result to the solvent action of the mono-nitro-naphthalene or other plasticity agent used during the condensation reaction, which action permits of greater freedom of molecular motion between the reacting substances, and prevents in large measure the spontaneous interruption of the condensation reaction which appears to ensue when such a plasticity agent is not used. When the plasticity agent is used as described, it apparently maintains the mass in a fluid condition at the reacting temperature sufficiently to permit free movement of the molecules of the reacting ingredients to allow the same to act upon each other completely, whereas, when the plasticity agent is not present, the solidifying of the mass in part by the reaction of certain molecules of the active ingredients results in preventing some others of the molecules of the reacting ingredients from getting full access to each other, the reaction thus being self-limited.

In my two applications referred to are described processes for forming an infusible product by the reaction of a methylene-containing substance, formaldehyde or polymer, or hexa-methylene-tetra-amin, with a fusible phenol resin, a plasticity agent being added in some cases. The added methylene-container varies somewhat in amount as stated, in accordance with the nature of the phenol resin, the amount of free phenol therein, the desired character of the final product, etc. If now, a considerable amount of methylene is added, within the limits there given, to a mixture including a plasticity agent, such as I have described, the resulting product is not so plastic, when heated, as a product made with a less amount of methylene in proportion to the phenol resin and free phenol. The product is, however, as hard as or harder than the pure phenolic condensation product containing no plasticity agent, notwithstanding the fact that the added solid solvent or plasticity ingredient may be present to the extent of from 10 to 50% of the final product. If, however, in a second case, the methylene added to a similar mixture including a plasticity or solid solvent ingredient is of a less amount, the plasticity of the final product formed, when heated, will be greater, so that the product may readily be embossed or impressed but the product is not so hard as in the first case.

The plasticity agent which I am about to describe combines in one product the desirable qualities of both of the products just referred to, (namely, hardness when cold and plasticity when heated), and in greater degree than occurs in the case of either, and in addition has other desirable qualities. It seems that the presence of this agent in the mass renders possible a more complete combination between the reagents than would be possible if it were not present.

As stated, the higher halogen substitution derivatives of phenols and their homologues are the substances which give the improved results described. The most effective substances of this class are those which are decidedly acidic, and which are capable of forming salts with bases. I prefer to use the chloro substitution products of phenols, particularly ordinary phenol. The acidic nature of these chloro or other halogen substitution products of phenols becomes more pronounced as the proportion of chlorin or other halogen in the same is increased. These products, particularly the higher substitution products, are very stable and may be distilled or sublimed, and have the almost unique quality of combining with ammonia ($HN_3$) to form a practically non-water-soluble solid. This is of great advantage when the ultimate infusible product is formed by reaction between a fusible anhydrous phenol resin and hexa-methylene-tetra-amin, as described in my application Serial No. 543,238, above referred to, in which the methylene radical of the compound reacts with the resin, with the liberation of ammonia, but no water.

I find that it is not essential to use any particular pure chloro phenol, although I prefer to use the penta-chloro phenol. I may use the mixture of the higher chlorination products which may vary between tri-chloro phenol and penta-chloro phenol. Or I may distil or sublime the crude chlorinated product and use the distillate or sublimate, or I may distil or sublime a part and use the residuum, which is of a pitch-like nature. When the chlorination is carried to the hexa stage with phenol, the product is not as desirable as the penta-chloro phenol, because there is a tendency to form products which are non-acidic and which will not combine with bases. When cresol is used instead of phenol, the most desirable product is the tetra-chloro cresol. The momo- and di-chloro phenols may be used as agents, if desired, but are not so desirable as the higher halogenized products, because they are odorous, and tend to condense with the methyleneating agents, which makes it difficult to determine the proper proportions of the ingredients.

When the halogenized phenol used absorbs ammonia during the reaction of the ingredients in a mass containing a methylene-amin as the hardening agent, the ammonia compound formed remains in the final product, and is a desirable non-water-soluble plasticity agent. The product seems to be an addition product of the chloro phenol and the ammonia. This ammonia chloro phenol product seems to give even better results in the final product as a plasticity agent than the chloro phenol containing no ammonia.

The compounds of acidic halogenized phenols with certain bases other than ammonia also may be used effectively as plasticity agents. When formaldehyde or its polymers are used as hardening agents, as described in application Serial No. 496,060 referred to, instead of hexa-methylene-tetra-amin, the ammonia compound of the chloro phenols may be separately formed and added to the ingredients, before the final hardening reaction, to act as a solid solvent or plasticity agent of the mass. Or in this case, if desired, the chloro phenols may be used as solid solvents without first combining the same with ammonia, with good results. The ammonia chloro phenol compounds are the more stable and efficient for the purpose the higher the chlorin substitution of the hydrogen in the phenol has progressed in the formation of the compound.

In case the chloro phenol or naphthol has a melting point above the temperature at which the reaction between the phenol resin and hexa-methylene-tetra-amin, or between other methylene containing and phenolic ingredients, takes place, naphthalene, or other low melting point substance which will also be effective as a solid solvent or plasticity agent for the final product, may be added to the chloro phenol to effectively lower the melting point of the mixture. When the chloro phenol and naphthalene or other substance used are mixed in equal weights, the melting point of the resultant product is below that of either substance.

When it is desired to purify the crude or the sublimed chloro phenol so as to free the same from any addition products of chlorin or of hydrochloric acid, the procedure may be as follows:—It is boiled with a 10% solution of caustic alkali and precipitated by dilute acid and washed. In processes such as described in my previous applications referred to, the chloro phenol may be used in proportions of from 10 to 30% of the phenol resin, and hexa-methylene-tetra-amin or other hardening agent containing the methylene radical used in proportions of from 6 to 11% of the weight of the phenol resin. The chloro phenol remains in intimate combination with the ultimate condensation product and cannot be removed to any appreciable extent even when finally powdered and treated with a neutral solvent for the chloro phenol, such as benzol, provided the proportion of chloro phenol is about 15% of the weight of the resin. Higher proportions of chloro phenol may, however, be used, which act more effectively as ammonia absorbers, and which do not impair the hardness and other desirable properties of the ultimate product. Chloro-phenolic substances as described may also be added to the reacting ingredients in processes such as described by Baekeland and others, in which the reagents are all introduced in full amount at the beginning of the process. In such a case, the chloro phenol or its salts is added to the ingredients before reaction, or at any time after partial reaction while the mass is still fusible, with good results, acting as a plasticity agent in solid solution or emulsion in the final product. The combination of ammonia with the chloro phenol, as stated, forms a practically non-water-soluble product, and does not liberate any water or other gaseous products. When the higher chloro phenols are used, there is no reaction between the same and hexa-methylene-tetra-amin at the temperature at which reaction takes place between phenol resin and the hexa-methylene-tetra-amin, namely, from 212 to 280 degrees F., and if there is no excess of hexa-methylene-tetra-amin in the mass, the chloro phenol will not condense at higher temperature. For obtaining light colored products, the sublimate or distillate of pure penta chloro phenol may be used. For dark colored products crude penta chloro phenol may be used, or the product remaining as a pitch after subliming penta chloro phenol. The latter is an amorphous solid of specific gravity of 1.8.

In my pending application Serial No. 580,058, filed Sept. 1, 1910, material for roofing, etc., and method of preparing same, I describe a composition or material comprising an infusible condensation product mixed or combined with a non-inflammable organic radical, such as substitution products of a halogen, other substances such as a mineral filler and a reinforcing material of fibrous or filamentary nature also preferably being included. Among the non-inflammable organic radicals described, the chloro phenols are mentioned. In the present application, however, I include claims broadly to phenolic condensation products containing chlorinated or other halogenized substitution products of phenol as a solid solvent or plasticity agent, and as an ammonia fixing agent.

It will be seen that my improved product is a composition which includes a substitution product of a phenol, or a basic compound of the same, or it may include both the substitution product and the basic compound, as in the case where the substitution product is added to a mixture in which ammonia is evolved during the reaction, part of the halogen substitution product being converted into an ammonia compound of the same, and part remaining unconverted.

In the following claims, the broad expression "substitution products of a phenol" or the like, is intended to include substitution products not only of phenol, but also of its homologues or derivatives, such as the creosols, cresols, naphthols, etc. The expressions "halogenated phenolic substance" and "chloro-phenolic substance" should be understood as including not only the halogen substitution products of a phenol, specifically the chlorin substitution product, but also the compound of the said substitution products with a base, such as ammonia, as described herein.

Having now described my invention, what I claim and desire to protect by Letters Patent is as follows:—

1. As a composition of matter, a phenol methylene condensation product containing penta-chloro-phenol incorporated therewith, substantially as described.

2. As a composition of matter, a phenol methylene condensation product containing a halogenated phenolic substance incorporated therewith, substantially as described.

3. As a new composition of matter, an infusible insoluble phenolic condensation product containing a halogen substitution product of a phenol in which the greater part of the hydrogen has been replaced by the halogen, combined therewith or in the state of solid solution therein, substantially as described.

4. As a new composition of matter, an infusible insoluble completely dehydrated phenolic condensation product containing a halogen substitution product of a phenol combined therewith in such manner as to be practically indissoluble therefrom by any neutral solvent therefor, substantially as described.

5. As a new composition of matter, an infusible insoluble phenolic condensation product containing a halogenated phenolic substance combined therewith or in the state of solid solution therein, substantially as described.

6. As a new composition of matter, an infusible insoluble phenolic condensation product containing the product formed by the action of ammonia on one of the higher chloro-phenols, together with one of the said chloro phenols combined therewith or in the state of solid solution therein, substantially as described.

7. As a new composition of matter, an infusible insoluble phenolic condensation product containing a chloro-phenol and naphthalene both combined therewith or in the state of solid solution therein, substantially as described.

8. As a new composition of matter, an infusible insoluble phenolic condensation product containing a halogenated phenolic substance and a substance adapted to act as a solid solvent for said condensation product and having a lower melting point than said halogenated phenolic substance, both combined therewith or in the state of solid solution therein, substantially as described.

9. As a new composition of matter, an infusible insoluble phenolic condensation product, containing a halogen substitution product of a phenol in which the greater part of the hydrogen has been replaced by the halogen, combined therewith or in the state of solid solution therein, and containing a cellular or fibrous filling material, substantially as described.

10. As a new composition of matter, an infusible insoluble phenolic condensation product containing a percentage of penta-chloro-phenol in the condition of solid solution therein, substantially as described.

11. The process of forming an infusible insoluble hot-plastic composition consisting in mixing together a fusible dehydrated phenol resin, penta-chloro-phenol, and hexa-methylene-tetra-amin in suitable proportions, and heating the same to a temperature of from 212 to 280 degrees F. for a length of time sufficient to cause the desired reaction, substantially as described.

12. The process of forming an infusible insoluble phenolic condensation product, consisting in mixing together ingredients which react on application of heat to form such a product, together with a suitable proportion of a higher halogenated phenolic substance, and heating the same sufficiently and for a sufficient length of time to cause the desired reaction, substantially as described.

13. The process of forming an infusible insoluble composition, consisting in mixing together a fusible phenol resin, hexa-methylene-tetra-amin compound and a chloro-phenol, and heating to cause a complete hardening reaction and the formation of a product of ammonia and the chloro-phenol within the mass and substantially non-separable therefrom, substantially as described.

This specification signed and witnessed this 20th day of January 1911.

JONAS W. AYLSWORTH.

Witnesses:

DYER SMITH,

ANNA R. KLEHM.